(No Model.)  8 Sheets—Sheet 1.

G. R. SKILLMAN.
BAKER'S OVEN.

No. 487,431.  Patented Dec. 6, 1892.

Witnesses  Inventor
George R. Skillman
By his Attorneys,
Chas. S. Hyer,
C. A. Snow & Co.

THE NORRIS PETERS CO., PHOTO-LITHO., WASHINGTON, D. C.

(No Model.) 8 Sheets—Sheet 3.

G. R. SKILLMAN.
BAKER'S OVEN.

No. 487,431. Patented Dec. 6, 1892.

Witnesses  Inventor
  George R. Skillman
By his Attorneys,
Chas. S. Hyer,  C. A. Snow & Co.

(No Model.) 8 Sheets—Sheet 4.

G. R. SKILLMAN.
BAKER'S OVEN.

No. 487,431. Patented Dec. 6, 1892.

Witnesses Inventor
George R. Skillman
By Attorneys, (No Model.) 8 Sheets—Sheet 5.

G. R. SKILLMAN.
BAKER'S OVEN.

No. 487,431. Patented Dec. 6, 1892.

Witnesses Inventor
George R. Skillman
By his Attorneys, (No Model.) 8 Sheets—Sheet 6.
G. R. SKILLMAN.
BAKER'S OVEN.

No. 487,431. Patented Dec. 6, 1892.

Witnesses Inventor
George R. Skillman
By his Attorneys, (No Model.) 8 Sheets—Sheet 7.

G. R. SKILLMAN.
BAKER'S OVEN.

No. 487,431. Patented Dec. 6, 1892.

Witnesses
E. C. Hurdeman
Chas. S. Hyer

Inventor
George R. Skillman
By his Attorneys,
C. A. Snow & Co.

THE NORRIS PETERS CO., PHOTO-LITHO., WASHINGTON, D. C.

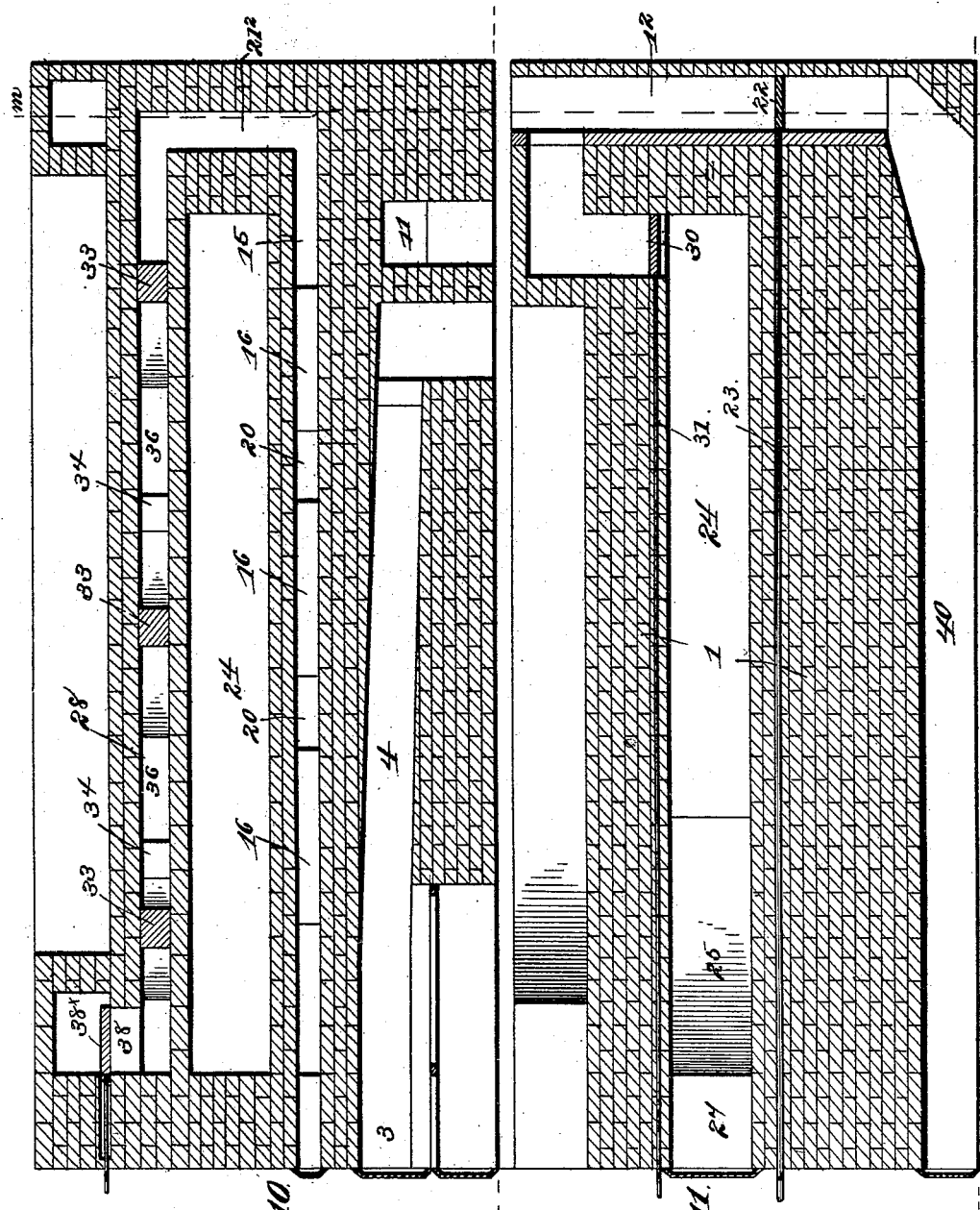

UNITED STATES PATENT OFFICE.

GEORGE R. SKILLMAN, OF BALTIMORE, MARYLAND.

BAKER'S OVEN.

SPECIFICATION forming part of Letters Patent No. 487,431, dated December 6, 1892.

Application filed April 26, 1892. Serial No. 430,708. (No model.)

*To all whom it may concern:*

Be it known that I, GEORGE R. SKILLMAN, a citizen of the United States, residing at Baltimore, in the State of Maryland, have invented a new and useful Baker's Oven, of which the following is a specification.

This invention has reference to certain new and useful improvements in bakers' ovens, and especially relates to the particular arrangement of flues by which a uniform and controllable heat throughout the entire oven is obtained, and by its peculiar construction deriving the benefit of all the heat thrown out by the products of combustion, and by reason of the arrangement for rapidly raising or lowering the temperature making the device entire well adapted for all the purposes of a bakery.

The object of the invention is to provide an oven of the character set forth, which is fully equipped and specially arranged for baking bread, pastry, cake, &c., which is adapted to be controlled from the exterior of the same, and one which may be readily cleaned to obviate choking of the several flues and of the parts surrounding the oven proper.

With this object in view the invention consists of the construction and arrangement of the parts as will be more fully hereinafter described and claimed.

Figure 1:
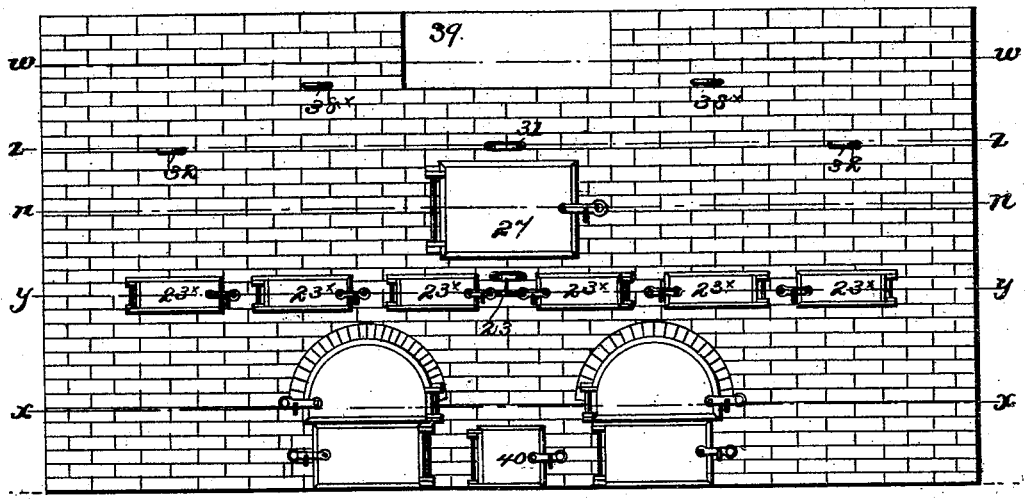
Figure 2:
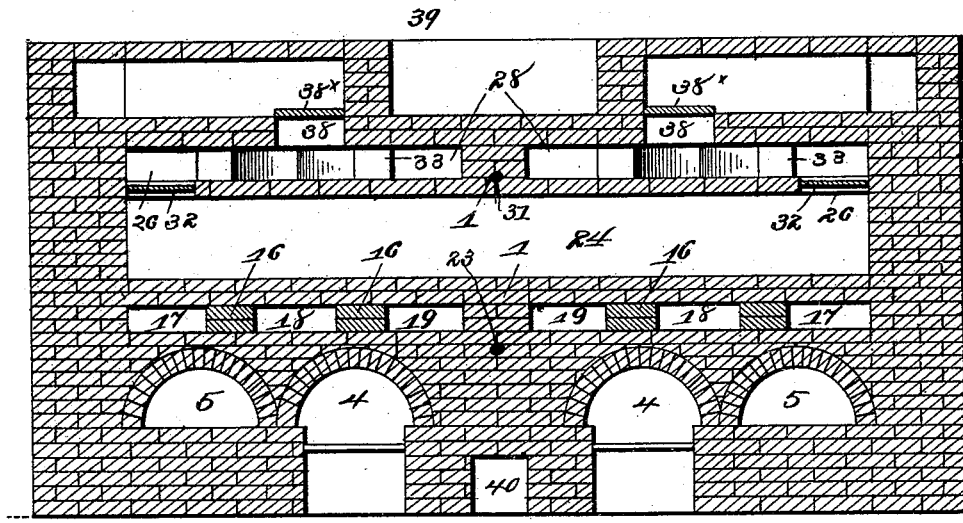
Figure 3:
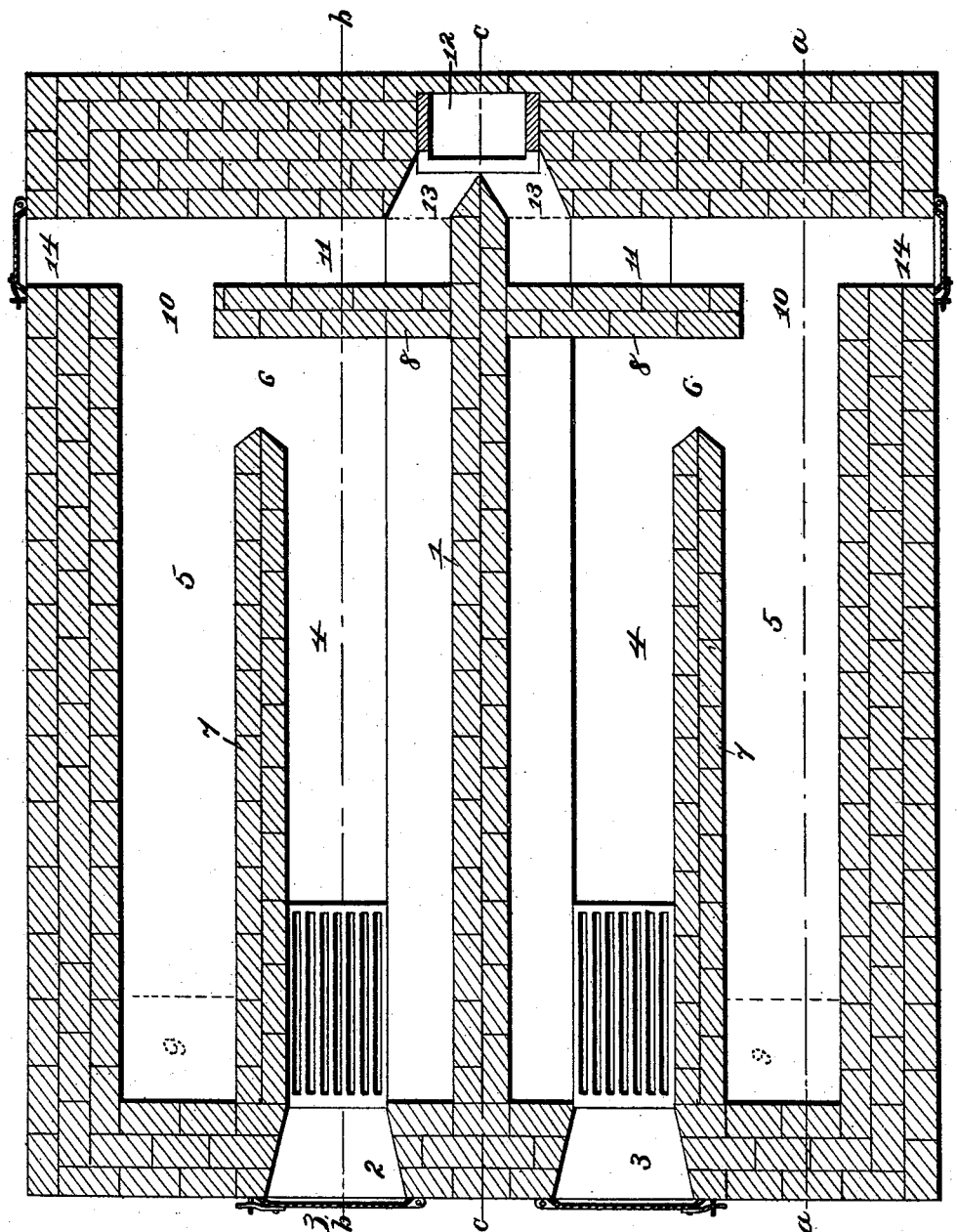
Figure 4:
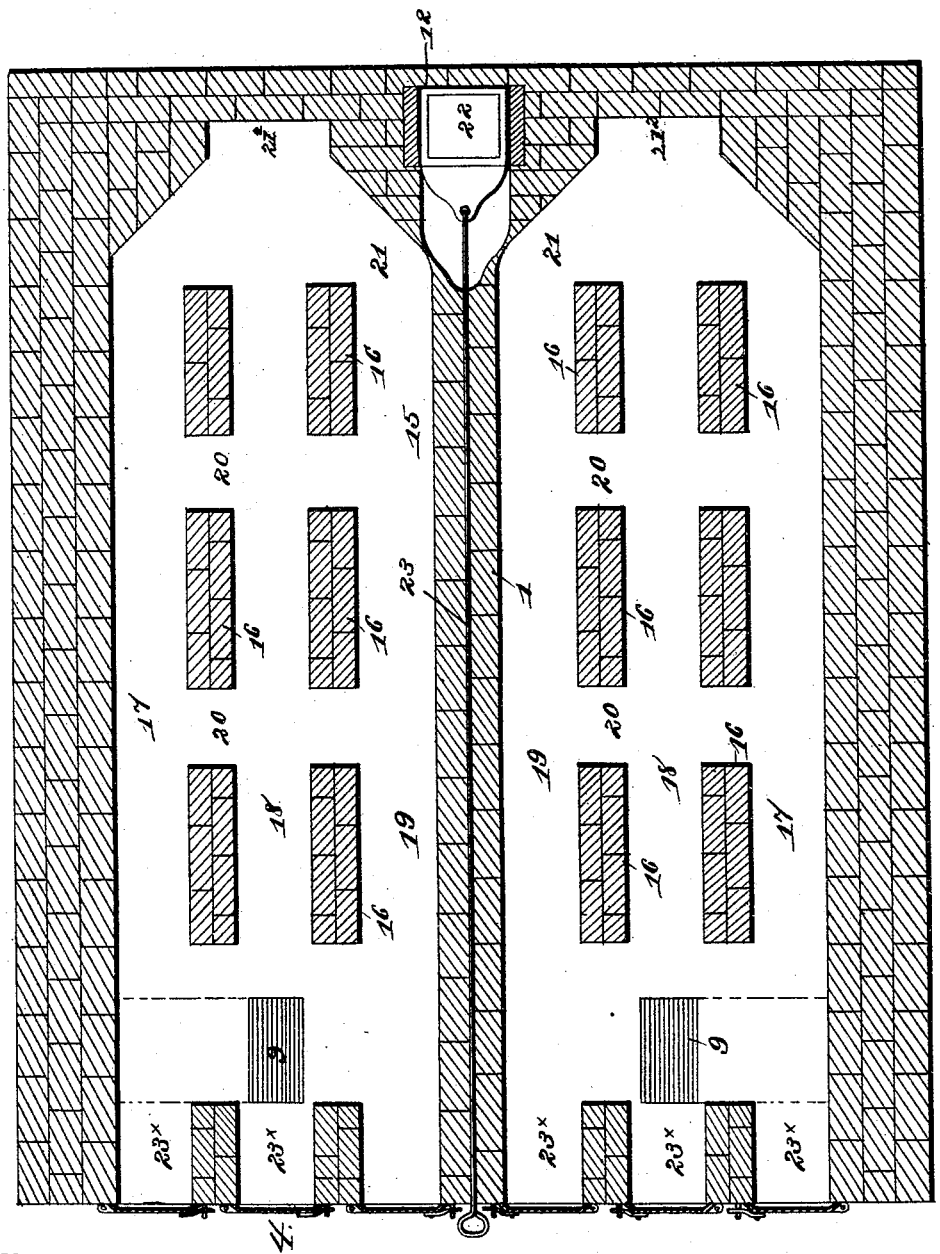
Figure 5:
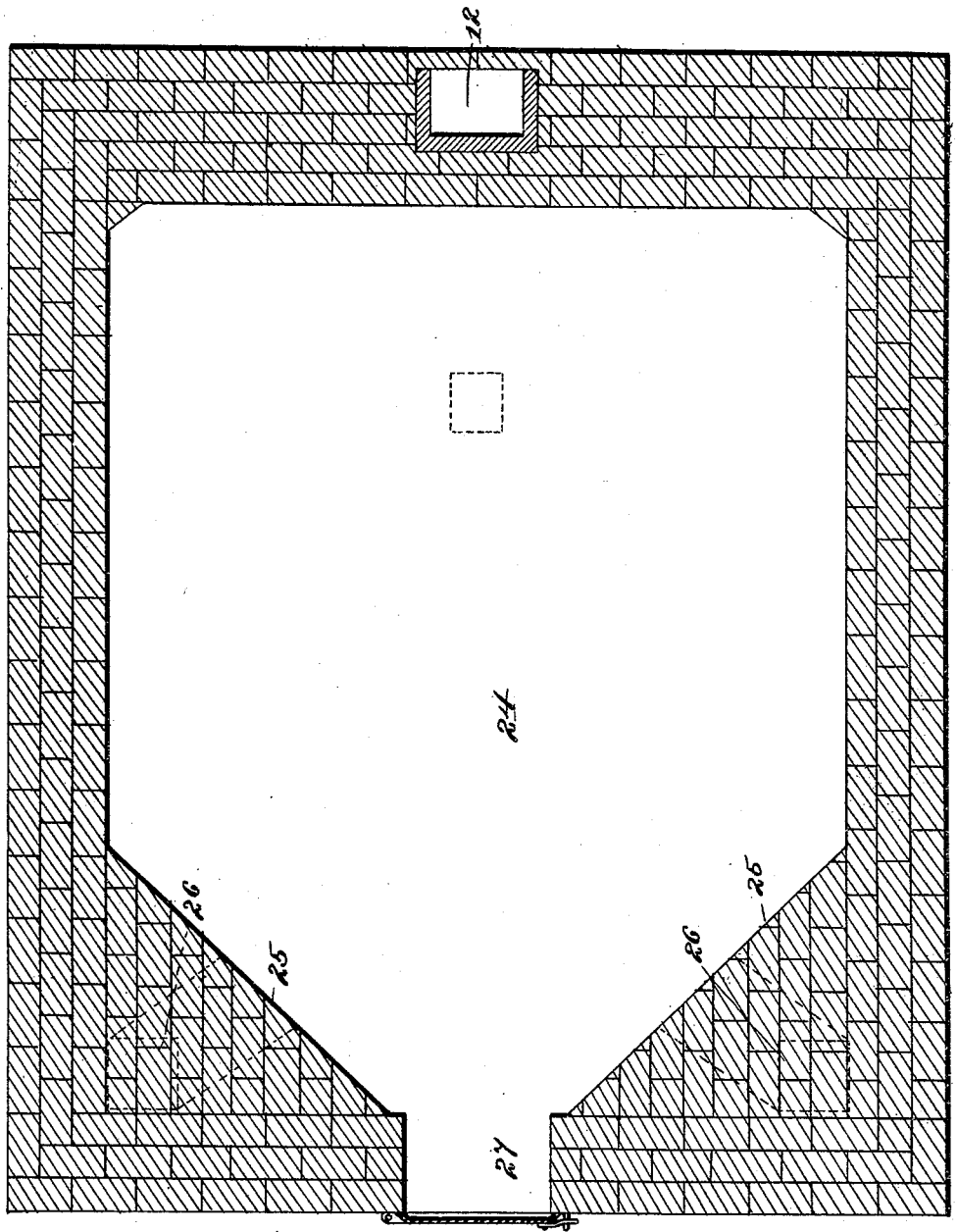
Figure 6:
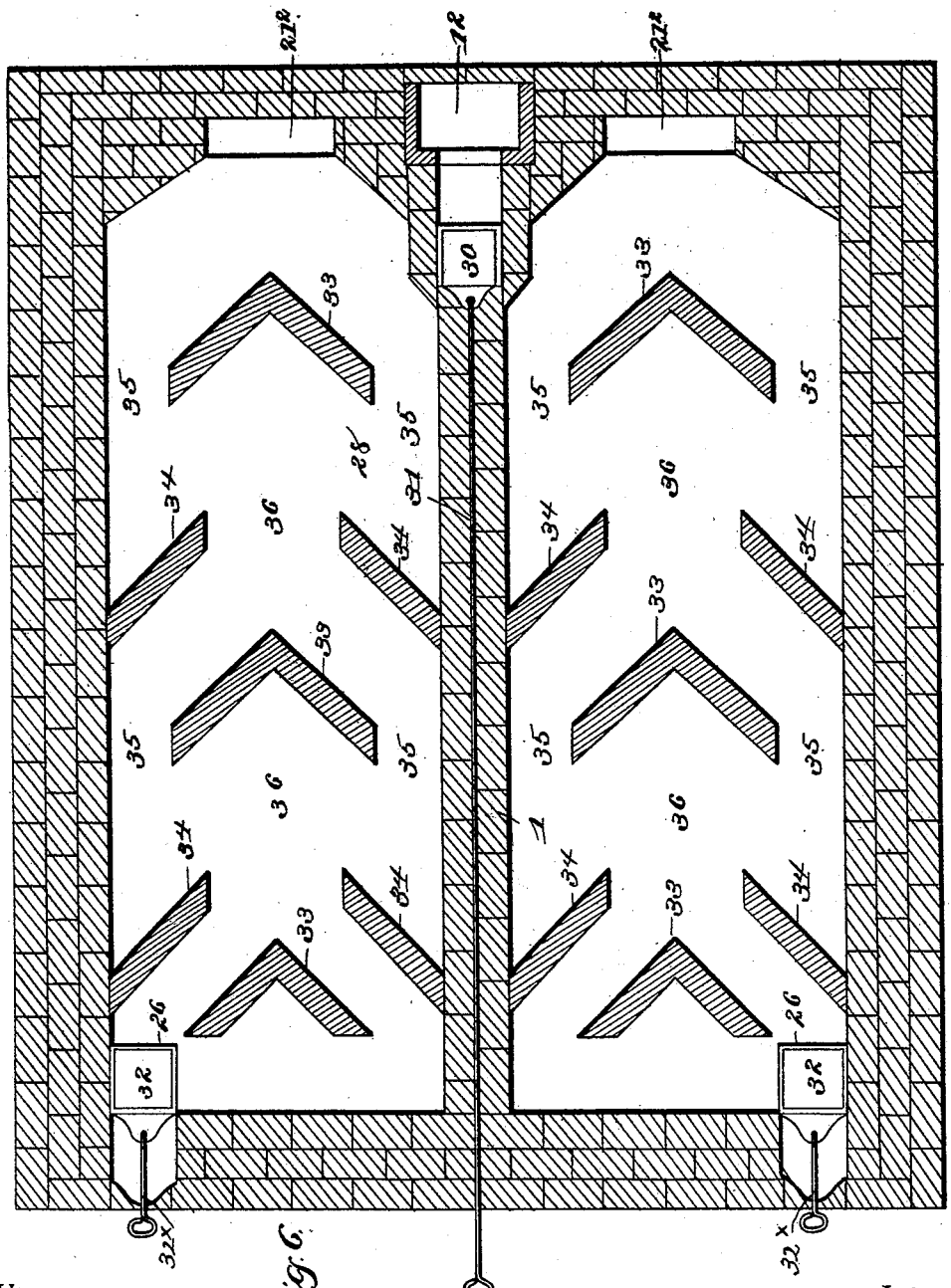
Figure 7:
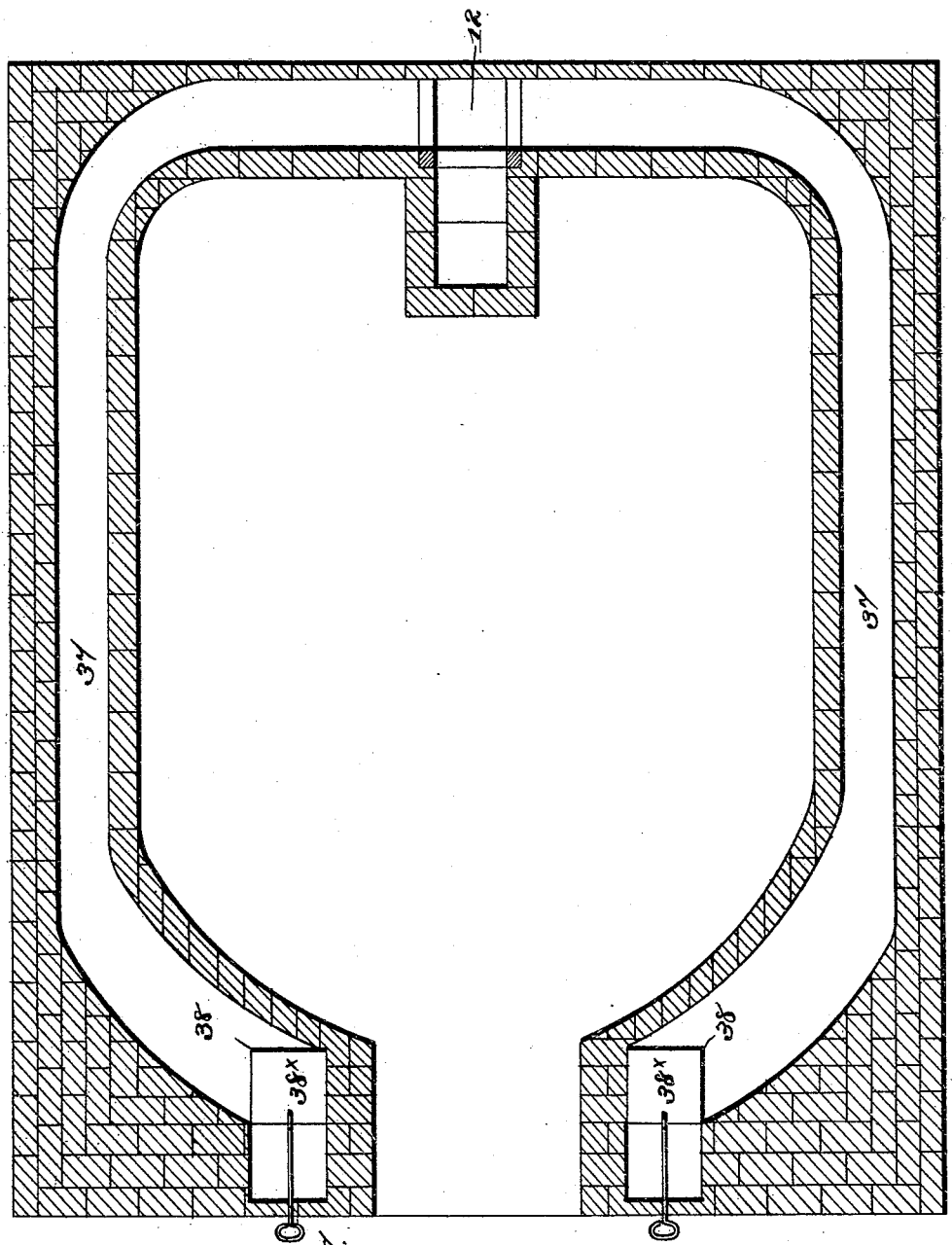
Figure 8:
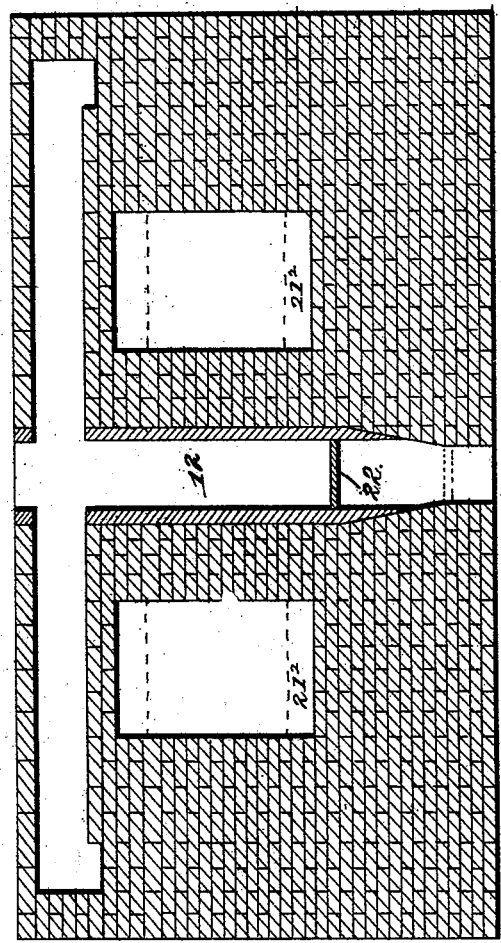
Figure 9:
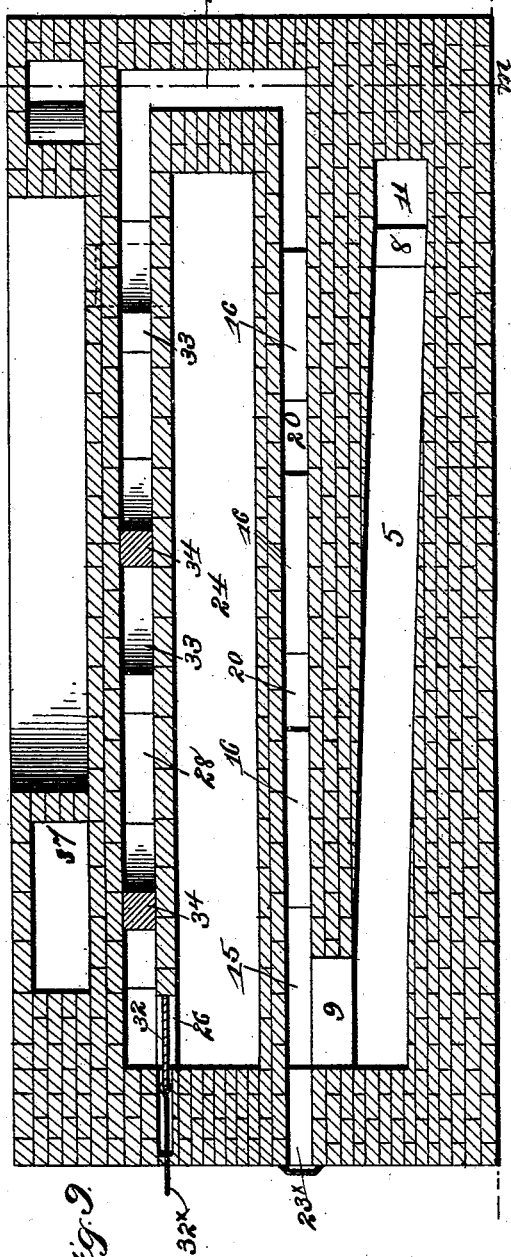

In the drawings, Figure 1 is a front elevation of an oven embodying the invention. Fig. 2 is a similar view with the front wall removed. Fig. 3 is a horizontal section on the line $xx$, Fig. 1. Fig. 4 is a horizontal section on the line $yy$, Fig. 1. Fig. 5 is a horizontal section on the line $nn$, Fig. 1. Fig. 6 is a horizontal section on the line $zz$, Fig. 1. Fig. 7 is a horizontal section on the line $ww$, Fig. 1. Fig. 8 is a transverse vertical section on the line $mm$, as shown positioned in the several longitudinal sections. Fig. 9 is a longitudinal vertical section on the line $aa$, shown positioned in the several horizontal sections. Fig. 10 is a view similar to Fig. 9 on the line $bb$. Fig. 11 is a view similar to Figs. 9 and 10 on the line $cc$, shown positioned in the several horizontal sections.

Similar numerals of reference indicate corresponding parts in the several views.

The oven is divided into two parts, except in the baking-chamber proper, by a division-wall 1, centrally located, and the duplicate sections of the ovens being similar in construction and arrangement only one section thereof will be particularly described.

The numerals 2 and 3 designate the entrances to the fireplaces of the sections of the oven, which open toward the front thereof and from which extends an arched flue 4, in each instance having a fall from the end of the grate-bars to the extreme rearward end thereof of one inch to the foot.

5 designates a return arch flue having the same fall from front to back as the flue 4, and the said flues 4 and 5 are connected at the rear by a cross-arch flue 6, which is formed through the end of the upright dividing-wall 7 of the flues 4 and 5 and rear right-angular extensions 8, extending from the division-wall 1. At the forward end of the return-flue 5 is an upright flue 9, which communicates with a flue-chamber above the same. Between the ends of the extensions 8, which form the fire-wall for the furnace proper, and the outer wall of the oven is a flue 10, which leads to a rear cross-flue 11 back of said extensions 8, and the latter in turn communicates with the chimney-flue 12, leading into a suitable chimney or stack, and between said flues 11 and 12 and a rear extension of the dividing-wall 1 are arranged flues 13. The said flues 11 open out of the side walls of the oven, as at 14, being supplied with suitable doors or closures, and by this means soot and other particles of combustion deposited in these flues may be conveniently removed.

Above the furnace-chamber, as has been set forth, is located a flue-chamber 15, wherein is arranged a series of pillars 16, arranged in pairs and forming longitudinal flues 17, 18, and 19 between the same and the outside wall of the oven and the dividing-wall 1, which are intersected by cross-flues 20. The rear portion of this flue-chamber 15 is formed with a passage or flue 21, adapted to communicate with the perpendicular flue $21^2$. The longitudinal flues 17, 18, and 19 in the chamber 15 are formed with front damper-openings $23^\times$, by means of which the heat of the same may be ameliorated or controlled. These damper-openings $23^\times$ are fitted with cast-iron boxes and drawers for cleaning out the said flue as an entirety or for the purpose of admitting cold air.

Above the flue-chamber 15 is the baking-chamber 24 or oven proper, which is narrowed at its front portion by oblique walls 25, through which extend flues 26, leading into the baking-chamber, as will be hereinafter more fully set forth. The said baking-chamber is also provided with a front opening or mouth 27, leading to the front portion of the oven proper and provided with a suitable door or closure. Superposed on or above the said baking-chamber 24 is a flue-chamber 28, into which enters the flue $21^2$ at the rear thereof, extending upward from the flue-chamber 15. At the opposite end portions of the dividing-wall 1 at this level are located horizontally-disposed dampers 30 and 32, which open into the top of the baking-chamber 24 and control communication of said baking-chamber with flues 12 and 26, being provided with operating-rods 31 and $32^{\times}$, extending through to the front of the oven. This latter chamber has a series of V-shaped pillars 33, which is intersected by obliquely-disposed pillars or walls 34, projecting inward from the outer wall of the oven and the dividing-wall 1, and between the ends of said V-shaped pillars and the adjacent outer wall of the oven and the dividing-wall passages or flues 35 are formed, and between the inner opposing ends of the pillars or walls 34 passages or flues 36 are formed, and by means of this construction a tortuous passage is provided, which deflects the heated current of air and smoke backward and forward until exit is gained. Above the said chamber 28, nearer the outer portion thereof, is located a flue 37, which communicates with the flue 12 at the rear thereof and has a smaller passage or vertical flue 38, communicating directly with the chamber 28, and may be controlled by a suitable damper $38^{\times}$. The top portion of the oven is constructed with two outside portions and a central portion 39, the center of which is preferably supplied with a suitable cover of a removable nature, whereby access to the uppermost flue-chambers may be obtained to thoroughly cleanse the same and prevent them from becoming foul. As has been stated heretofore, the portions of the several chambers on each side of the dividing-wall 1 are formed precisely alike or duplicated, and the pillars 16 of the chamber 15 and pillars 33 and 34 of the chamber 28 are formed with a view to providing support for the parts above the same and also as deflectors to render the passage of the heated current tortuous to avoid a too-rapid circulation, which would result in a reduction in the amount of caloric given off in the several chambers, as will be readily apparent. These pillars are formed of fire-brick or analogous material and are situated above and below the baking-chamber in order to thoroughly heat the bottom and top thereof and produce a regular and equal temperature throughout the same.

The fall of the flues 4 and 5 has the effect of holding back the heat without interfering with the draft, and also adds to the thickness of the oven-floor at the back portion thereof, which prevents bread, cake, &c., located in the back part of the oven for the purpose of baking from becoming overbaked. The flues 11 and 12 and chimney-damper 22 permit the smoke and all other products of combustion to pass directly out to the chimney, thus preventing all the other flues of the oven from being clogged up with dust, soot, &c. These parts also serve the purpose of lowering the temperature, if at any time so desired, as the heat may be sent directly through the same to the chimney without entering any of the working flues of the oven. The flues 17, 18, 19, and 20, located directly under the floor of the baking-chamber 24, may be increased or decreased in size proportionate to the size of the oven entire, and, as has already been stated, they provide for an equal distribution of the heat under the bottom of the floor of the baking-chamber and avoid a too-rapid circulation. These flues may be cleaned through the openings $23^{\times}$ at any time found desirable, and the doors of the said openings are covered with asbestus for a well-known purpose. The angularly-disposed pillars or walls 33 and 34 of the chamber 28 may be set at other angles than those illustrated; but for the purposes of a small oven said angles, as shown, are preferred, and the advantage of a construction of this kind resides in obtaining a uniform heat by a slow circulation at this point through the medium of the tortuous arrangement of the flues, and thereby heat every part of the roof of the baking-chamber equally and obtain an equal color or uniform baking of the top portion of the bread, cakes, pastry, &c., in the oven. By throwing open the doors of the openings 23, opening damper 22 and damper 30, and also opening the door at the mouth of the baking-chamber 24 and closing dampers 32 and $38^{\times}$ the heat of the oven is rapidly reduced, as the heat will then be drawn directly from the furnaces into the chimney, and by opening the furnace-doors the cold air from without will be drawn over the fire-bed and also reduce the temperature in flues 4 and 5. The cold air from without will also be drawn into the baking-chamber 24 and through damper 30 into the chimney.

At the bottom central portion of the oven is a flue 40, which extends from the front to the rear directly under the chimney-flue and makes it readily convenient for cleaning the ashes, &c., collecting in the back of the oven away from said part of the oven and drawing the same outward toward the front.

By means of the construction of flues as fully set forth a great saving in fuel is obtained in view of the fact that a larger proportion of heat may be obtained from a smaller amount of fuel by virtue of the tortuous passages, which provide for longer period of exit of the smoke and particles of combustion, to thereby gain a greater radiation of heat carried thereby.

Whenever a new fire is made or fire-bed cleaned or replenished with fuel, all the dampers are closed except damper 22 of the chimney-flue, which remains wide open until the fire is burning bright and free of smoke, and then closed. Dampers 38× are then opened a sufficient distance to permit a good draft in both furnaces until after the oven is sufficiently heated, and then said dampers are closed fully, or if a strong top heat is required they are left about one-quarter open, when the oven will be in condition for baking. Should the heat in the baking-chamber 24 become too intense, the dampers 38× are closed, damper 22 opened, and the furnace-doors, the door of the mouth of the baking-chamber, and the damper 30 are all opened, which will cause the heat to rapidly fall, and if a still more rapid fall is desired the doors of openings 23× are also thrown open. Should the oven be below the necessary degree of temperature, the said parts are closed, with the exception of dampers 32 and 30, the latter being open just enough to make circulation and no more. If a strong solid heat is desired, the damper 30 is closed, thereby holding the heat within the baking-chamber 24 and cutting the latter off from the chimney-flue.

If the work to be done should be variable in its nature, it will be accomplished by the manipulation of the dampers 32, which are kept open and all others closed, except when it be necessary to open damper 30, and by this operation it will be found that a great economy in fuel will be obtained.

Having thus described the invention, what is claimed as new is—

1. In an oven of the character set forth, the combination of a baking-chamber and flue-chambers arranged above and below the same, the said flue-chamber below the baking-chamber having vertical pillars arranged therein at intervals and spaced apart and the flue-chamber above being provided with angularly-disposed centrally-located walls intersected by oblique walls, substantially as described.

2. In an oven of the character set forth, the combination of a baking-chamber, a flue-chamber below said baking-chamber, having parallel pillars or walls arranged therein to form tortuous flues, and a flue-chamber over said baking-chamber, having angularly-disposed pillars or walls, a damper located between the front upper part of the baking-chamber and the flue-chamber, immediately above the latter, for the purpose of establishing a communication between said parts, flues connecting the said flue-chambers, and a lower furnace-chamber having arched walls and also provided with transverse walls at the back thereof, forming transverse flues opening out at the opposite sides of the oven and also into a centrally-located rear chimney-flue, the latter also being in communication with a portion of the aforesaid chambers, substantially as described.

3. In an oven of the character set forth, the combination of a baking-chamber, a flue-chamber below said baking-chamber, and a flue-chamber above the said baking-chamber, provided with centrally-disposed V-shaped pillars or walls having obliquely-disposed pillars or walls extending into the space between the said V-shaped pillars or walls, substantially as described.

4. In an oven of the character set forth, the combination of a baking-chamber, a lower furnace-chamber having flues therein, transverse flues or passages at the rear of said furnace-chamber and opening out of the side walls of the oven and communicating with the chimney-flue, and a longitudinal flue below the furnace-chamber and extending centrally into the lower portion of the oven to the back thereof, substantially as described.

5. In an oven of the character set forth, a baking-chamber having a dividing-wall located above and below the same, and duplicate furnace-chambers and flue-chambers on each side of said wall and connected with each other by independent vertical flues and suitable dampers at opposite ends, substantially as described.

6. In an oven of the character set forth, the combination of a baking-chamber, a flue-chamber below the same, a single chimney-flue in rear of the central part of said flue-chamber, a damper mounted in said chimney-flue, a flue-chamber above the said baking-chamber, and a damper in the top of said baking-chamber, communicating with the chimney-flue, substantially as described.

7. In an oven of the character set forth, the combination of independent furnace-chambers separated by a central dividing-wall with lateral extensions, forming fire-walls, and said chambers each partially divided by other walls to form outer flues, each of said chambers also having a communicating passage to a single chimney-flue in rear of the lateral extensions of the said central dividing-wall, lower double tortuous flue-chambers above said furnace-chambers, an undivided baking-chamber above said tortuous flue-chambers and having a top damper connection with the chimney-flue and also adapted to be thrown into communication with said lower tortuous flue-chambers, upper tortuous flue-chambers next above the baking-chamber, having communicating flues with lower tortuous flue-chambers and supplied with dampers for controlling said communication, and a double topmost flue-chamber, all adapted to be thrown into communication or only partially connected, substantially as described.

In testimony that I claim the foregoing as my own I have hereto affixed my signature in the presence of two witnesses.

GEO. R. SKILLMAN.

Witnesses:
LEML. G. T. SANDS,
JOS. GALLAGHER.